United States Patent
Brandstatter

[11] 3,922,885
[45] Dec. 2, 1975

[54] APPARATUS FOR CONTROLLING PATTERN DRUMS PARTICULARLY IN CIRCULAR KNITTING MACHINES

[75] Inventor: Miroslav Brandstatter, Brno, Czechoslovakia

[73] Assignee: Vyzkumny a vyvojovy ustav Zavodu vseobecneho strojirenstvi, Brno, Czechoslovakia

[22] Filed: Aug. 13, 1973

[21] Appl. No.: 388,243

[52] U.S. Cl. .............. 66/50 B; 192/67 R; 192/93 R
[51] Int. Cl.² .................. D04B 15/74; F16D 11/04; F16D 19/00
[58] Field of Search .......... 66/50 B, 154 R, 156, 25; 192/67 R, 93 R

[56] References Cited
UNITED STATES PATENTS

| | | |
|---|---|---|
| 3,004,413 | 10/1961 | Felker .................. 66/50 B |
| 3,076,326 | 2/1963 | Mazzi .................. 66/50 B |
| 3,616,655 | 11/1971 | Guell .................. 66/156 |
| 3,739,601 | 6/1973 | Plath .................. 66/50 B |
| 3,748,871 | 7/1973 | Ludwig et al. .......... 66/50 B |
| 3,759,069 | 9/1973 | Scheffler et al. ....... 66/50 B |
| 3,783,640 | 1/1974 | Bourgeois ............. 66/50 B |
| 3,797,277 | 3/1974 | Guell .................. 66/50 B |

FOREIGN PATENTS OR APPLICATIONS

| | | |
|---|---|---|
| 1,020,741 | 2/1966 | United Kingdom ........ 66/154 |

Primary Examiner—W. C. Reynolds
Assistant Examiner—A. M. Falik

[57] ABSTRACT

A part such as a program drum of a circular knitting machine is turned one or more steps in one or the other direction by a cylindrical body coaxial with and selectively coupled to the program drum. The cylindrical body is turned by a number of lateral surfaces of wedges arranged opposite to the cylindrical body on a machine part which moves with respect to the program drum, the degree of turning of the cylindrical body determined by the adjusted height of the wedges with respect to the cylindrical body. Some lateral surfaces of the wedges effect the turning of the cylindrical body in one direction; other lateral surfaces of the wedges effect the turning of such body in the opposite direction.

4 Claims, 11 Drawing Figures

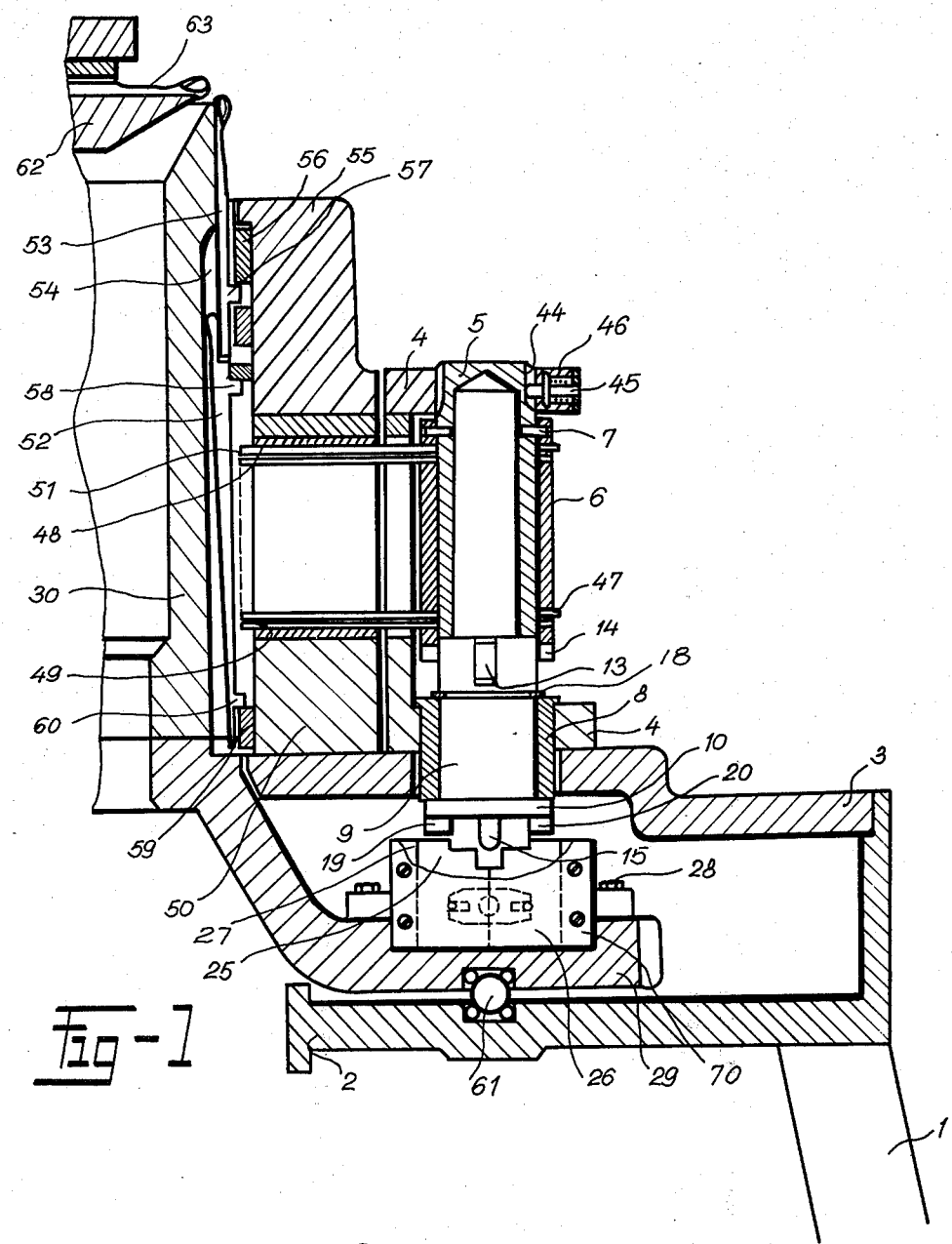
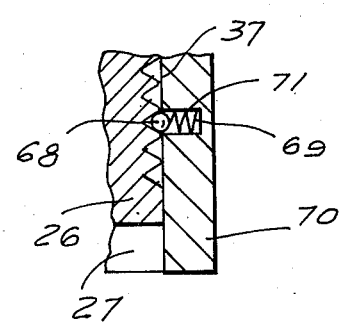

APPARATUS FOR CONTROLLING PATTERN DRUMS PARTICULARLY IN CIRCULAR KNITTING MACHINES

BACKGROUND OF THE INVENTION

The invention relates to a device for multistage control of parts of circular knitting machines in both directions, such parts being for instance, pattern devices, distributing devices, control devices for cylinder and dial locks, feeding devices and the like.

These devices are usually provided with program drums with projecting removable pegs or cams which are distributed according to a chosen program. The required operation of elements of the knitting machine in engagement therewith is achieved by turning the program drum. In order to provide a broader selection of individual functions than is possible by simply turning the drum, a number of control means have been devised which perform the turning, that is, the switching of the drum, either through one or two steps, which simultaneously enable the drums to remain in a required position for any chosen time. These control devices usually employ the principle of a pawl and ratchet wheel, the ratchet wheel being firmly connected to the program drum and the pawl forming the final element of a system of rods and levers. These devices provide only a unidirectional turning movement of the drum. The ratchet-pawl system can be also used for a two-way turning movement of the program drum by connecting to the program drum two ratchet wheels with two engaging pawls, linked with two systems of rods and levers, only one of the pawls being in engagement with the ratchet wheel at any time.

An arrangement is also known which provides a forward and reverse movement of the program drum through one or two steps. This arrangement comprises a dial firmly connected to the program drum and provided with radially arranged slots. Two bolts fixed on a rotatably supported element engage into said slots, said supporting elements being connected to a star shaped body which engages with bolts in supporting elements which are adjustable in height. If the program drum has to be turned through one step, the star engages with bolts of one supporting element; if it has to be turned for two steps, the star engages with two supporting elements arranged in series and being adjustable in height. Reverse movement of the drum is accomplished by similarly situated further bolts in further adjustable supports arranged along the first two supports so that the bolts of the second two supports engage with the star-shaped body from the opposite side. The supports are provided on the rotating support for the needle bed.

The last described known arrangement has the advantage that it can turn the drum through one or two steps ahead or back. It has the disadvantage, however, that the turning through two steps takes twice as long as the turning of the drum through one step. This drawback would be still more apparent if the drum should be turned through three or more steps. Another drawback is that it is relatively very complicated and demanding for manufacturing.

A disadvantage of arrangements with a single pawl-ratchet system is that the drum can be turned only in one direction. The application of two pawl-ratchet systems, permitting the turning of the drum in both directions, is also very complicated.

SUMMARY OF THE INVENTION

It is an object of this invention to provide a mechanism which turns a program drum in any direction through one or more steps within equal time intervals.

It is another object to provide a construction which is relatively simple and easy to manufacture.

The arrangement according to this invention has a program drum rotatably mounted on the frame of the machine, with a cylindrical body supported coaxially at one end of said program drum. The cylindrical body is provided at one end with a transverse recess, there being a coupling pawl supported pivotally on a bolt in said recess, and a number of slots provided on the face of the program drum. The coupling pawl is adapted temporarily to connect this cylindrical body with the program drum by engagement of one end of this coupling pawl into one of said slots. A sliding guide is provided on the other end of the cylindrical body, there being two cylindrical extensions arranged on said sliding guide, two control wedges and two control wedges with lateral surfaces adjustably arranged as to their height opposite to the sliding guiding on a machine parts which performs a relative movement with respect to the program drum for engagement with said cylindrical extensions of the sliding guide means for control of the position of the coupling pawl in said cylindrical body for the selective connection and disconnection of the cylindrical body with the program drum.

The control means for the control of the position of the coupling pawl can be a rod slidably arranged in the cylindrical body, one end of this rod being adapted for engagement with the free arm of the coupling pawl, the other end being adapted for engagement with a return wedge and a spring loaded pressure bolt which is also slidably arranged in the cylindrical body for engagement with the other arm of the coupling pawl.

An advantage of the control device according to the invention is that the program drum may be turned in either direction through one, two or more steps within the same time interval.

Another advantage is the relative simplicity and ease of manufacture of the control device.

DESCRIPTION OF THE DRAWINGS

An examplary embodiment of this invention is shown in the attached drawings, wherein FIG. 1 is a partial axial sectional elevation of a cylindrical needle bed with a program drum and a device for the multistep turning of the drum in both directions;

FIG. 5A is a section through FIG. 5 taken along line A—A in FIG. 5;

DESCRIPTION OF THE PREFERRED EMBODIMENT

Figure 2:
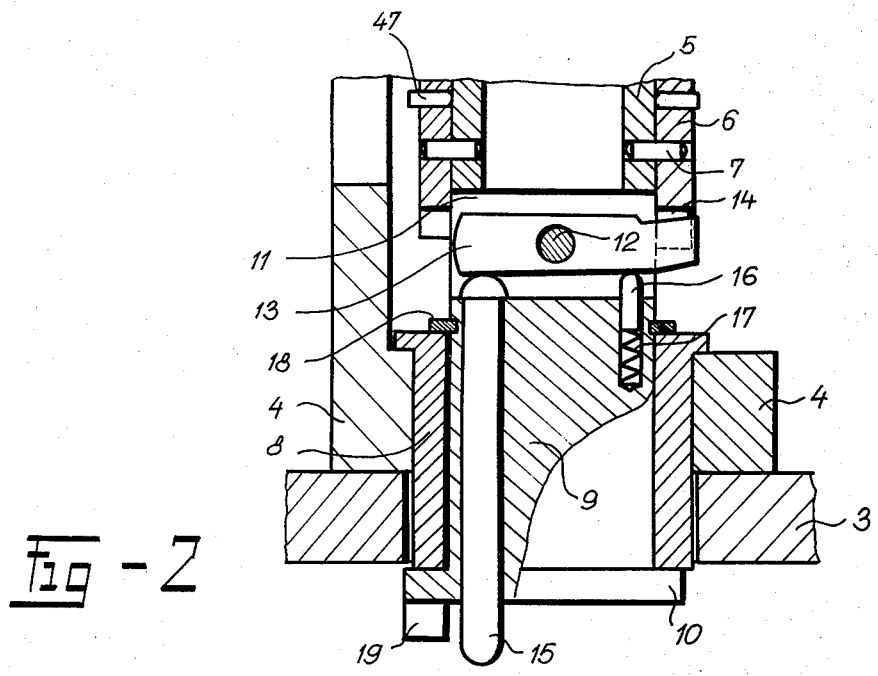
FIG. 2 is a partial sectional elevation of a program drum connected by a coupling pawl with the body of a sliding guide.

A table 2 with a circular ring-shaped plate 3 is fixed to the stationary frame 1 of a circular machine. A plurality of angularly spaced consols 4 (one shown in the drawings) are fixed to the circular plate 3, each of consoles 4 supporting a rotatable core 5. A program drum 6 is supported on each of cores 5, the drums being connected with the cores 5 by bolts 7.

A bearing bushing is provided in the lower part of each consol 4 coaxially with the program drum 6, bushing 8 rotatably supporting a cylindrical body 9, the end of which below the circular plate 3 engages a sliding guide 10. A transverse recess 11 (FIG. 2) is arranged at the opposite end of the cylindrical body 9, which joins the core 5; a coupling pawl 13 is rotatably supported in said recess by pivot bolt 12. The pawl 13 is adapted on its radially outer end for engagement with the program drum 6 which is provided for this purpose on its lower face with a system of slots 14. A rod 15 engaging with the free arm of the coupling pawl 13 on the other side of pivot bolt 12 is arranged to slide in a guideway in the cylindrical body 9. There is also provided in the cylindrical body 9 a slidable pressure bolt 16 loaded by the force of a compression spring 17, the spring urging the coupling pawl 13 to engage with the lower end of the program drum 6.

The cylindrical body 9 is maintained in the bearing bushing 8 on one side by a retaining ring 18 on the other side by the sliding guide 10. The sliding guide 10 has two cylindrical extensions 19 and 20 (FIG. 1) for engagement with oppositively orientated lateral surfaces 21, 22, 23 and 24 (FIG. 5) of two control wedges 25 and 26 supported for sliding vertically in a guide 27 fixed by screws 28 to a support 29 for the cylindrical needle bed 30. Guide 27 has a cover 70 (FIG. 1). The control wedges 25 and 26 are mutually connected by a two-arm, that is, first-class, lever 31 (FIG. 5) pivotally supported on a bolt 32 fixed in the guide 27 for the control wedges 25 and 26. Both ends of the two-arm lever 31 are provided with recesses 33 and 34 for engagement with two bolts 35 and 36 fixed to the respective control wedges 25 and 26 so that one bolt 35 is in engagement with one recess 33 and the other bolt 36 is in engagement with the recess 34 of the other control wedge 26. One of the control wedges 26 has a number of recesses 37 for receiving the rounded hose of a spring loaded bullet catch (68 FIG. 5A) for securing the control wedges 25 and 26 at the desired height.

Figure 4:
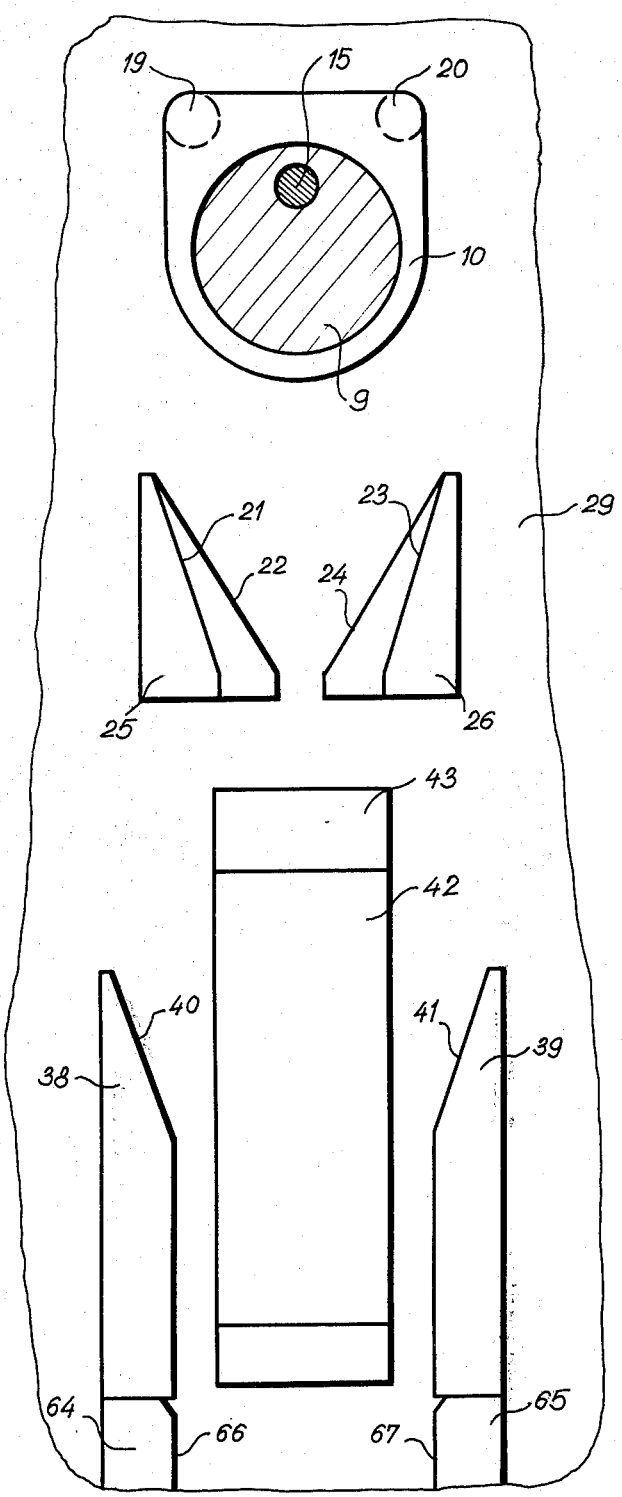
FIG. 4 is a schematic top view of the arrangement of the sliding guiding with the cylindrical body in the starting position and the wedges cooperating therewith, such wedges being located on a rotating support of the cylindrical needle bed.

On the support 29 for the cylindrical needle bed 30 (FIG. 4) in addition to the two control wedges 25 and 26, there are fixed two return wedges 38 and 39 having lateral surfaces 40 and 41 for engagement with cylindrical extensions 19 and 20 of the sliding guide 10. An unlocking wedge 42 with an inclined surface 43 for engagement with the rod 15 is provided between the return wedges 38 and 39. All wedges 25, 26, 38, 39 and 42 are situated on the support 29 in such a sequence that first the control wedges 25 and 26 come in engagement with the sliding guide 10, followed by the action of the unlocking wedge 42, and finally of the return wedges 38 and 39.

Two guiding ledges 64 and 65 with lateral surfaces 66 and 67, arranged on the remaining part of the circumference of the support 29 of the cylindrical needle bed 30, succeed the return wedges 38 and 39.

The core 5 of the program drum 6 at its place of support in a part of the consol 4 is provided on its circumference with longitudinal grooves 44 (FIG. 1) for engagement with a locking pin 45 which is slidably arranged in the consol 4 under the pressure of a coil compression spring 46.

Pegs 47 are provided in the program drum 6 for the control of selectors 48 of plate shape being slidably arranged in a case 49 which is fixed to a lower cylindrical block 50 encompassing the cylindrical needle bed 30. The lower cylindrical block 50 is fastened to the circular plate 3 of the table 2. The opposite ends of the selectors 48 are adapted for engagement with pattern butts 51 of jacks 52; jacks 52 together with the cylindrical knitting needles 53, are slidable in needle slots 54 in the cylindrical needle bed 30. An upper cylindrical block 55 is fixed to the lower cylindrical block 50, to the internal circumference of which there is fixed a system of cam elements 56. The cam elements 56 engage both the butts 57 of knitting needles 53 and lowering butts 58 of jacks 52. A system of cams 59 for lifting jacks 52 are fixed to the internal circumference of the lower cylindrical block 50, cams 59 being adapted for engagement with lifting butts 60 provided on the lower ends of the jacks 52.

The cylindrical needle bed 30, together with its support 29, is rotatably supported on a bearing 61 arranged between the support 29 and the fixed table 2.

A dial needle bed 62 with a system of dial knitting needles 63 is provided adjacent the upper part of the cylinder needle bed 30 in the respective positions shown.

In the course of operation of the knitting machine, the knitting proceeds in the following manner: the cylindrical needle bed 30 and the dial needle bed 62, together with the support 29, rotate on the bearing 61 on the fixed table 2 in a known way. The knitting proceeds by means of dial knitting needles 63, of the dial needle bed 62, which are actuated by a known device (not shown) and by means of cylinder knitting needles 53 of the cylinder needle bed 30. The cylinder knitting needles 53, as shown in FIG. 1, are actuated by means of the jacks 52 so that the lifting butts 60 are in engagement with the lifters 59 of jacks.

The actuation of individual cylinder knitting needles 53 is controlled by the program drum 6 with extending pegs 47; such pegs as the program drum 6 turns, shift the selectors 48 in the case 49. The opposite ends of the selectors 48 move the jacks 52 so that the lifting butts 60 of the jacks come into a position beyond engagement with the lifting cams 59 and the respective cylinder knitting needles 53 situated above these swung-out jacks remain in their inoperative position whereas cylinder knitting needles 53 above those jacks 52 which have not been moved by the control drum perform their operating stroke.

The turning of the program drum 6 with its core 5 is accomplished by wedges 25 and 26 situated on the rotating support 29 of the cylindrical needle bed 30. In order to cause a turning of the program drum 6, one of the control wedges 25 or 26 has to be moved vertically from its fundamental position, the position shown in FIG. 5 to the position wherein one of the cylindrical extensions 19 or 20 of the sliding guide 10 comes into engagement with one of the lateral surfaces 21, 22, 23 or 24 of one of the control wedges 25 or 26, as shown in FIGS. 7, 8, 9 and 10. Due to passage of the control wedges 25 or 26 under the program drum 6, there is produced a sliding or rolling of the respective one of cylindrical extensions 19 and 20 along the respective one of the lateral surfaces 21, 22, 23 and 24 of the control wedges 25, 26 and thus also there is produced an angular displacement of the sliding guide 10 and of its cylindrical body 9 in the bearing bushing 8. The turning of the cylindrical body 9 is transmitted by the engagement of the outer end of coupling pawl 13 into one of the slots 14 in the lower end of the program drum 6.

Figure 3:
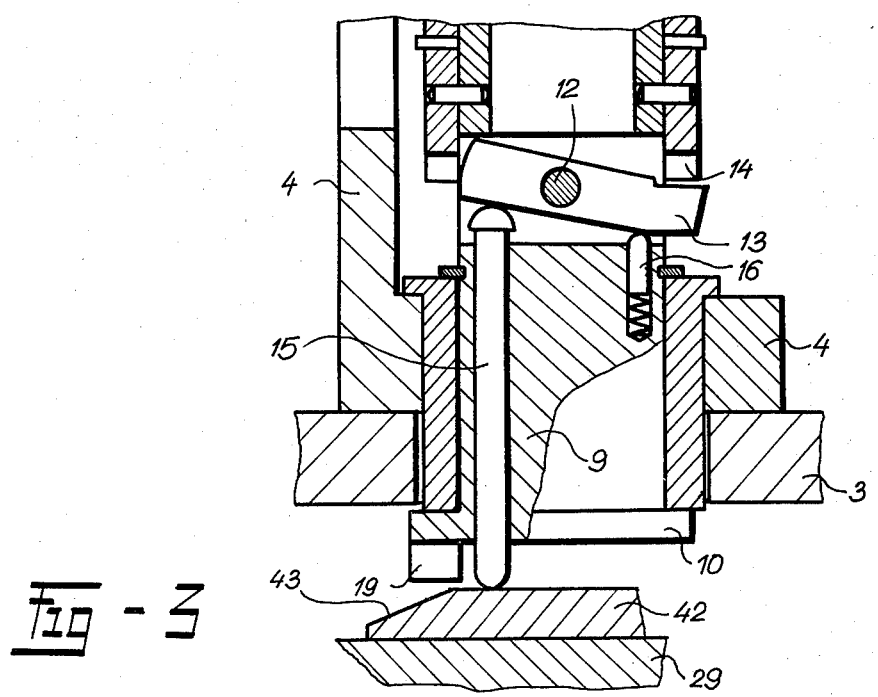
FIG. 3 is a similar view of the program drum in its disconnected position.

The coupling pawl 13 is in the form of a first-class lever. A first arm of the coupling pawl 13 fits into the recess 14 in the lower part of the program drum 6. The other, second arm of the coupling pawl 13 is controlled by means of the rod 15, which in FIG. 3 is shown in contact with the unlocking wedge 42.

The coupling pawl 13 is urged by the spring loaded pressure bolt 16 into the slot 14. Due to turning of the program drum 6, the locking pin 45 is forced out of one of the longitudinal grooves 44 on the core 5. After the program drum 6 has finished its turning movement, the locking pin 45, due to the action of the spring 46, enters a further longitudinal groove 44, thus locking the program drum 6 in the adjusted position. It will be understood that all program drums 6 situated in angularly spaced positions around the circular plate on the circumference of the cylindrical needle bed 30 are gradually turned in this manner.

Figure 8:
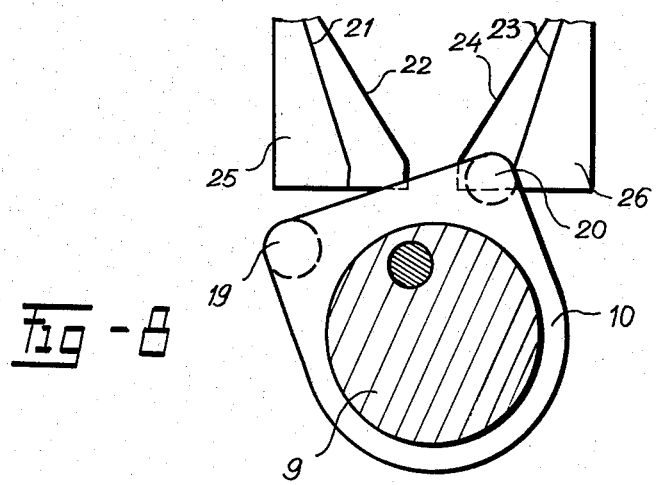
FIG. 8 is a schematic top view of the control wedges in engagement with the sliding guide turned through one step.
Figure 9:
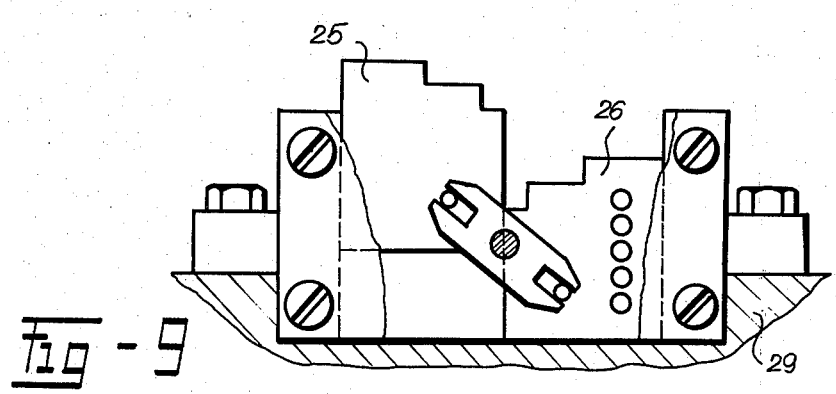
FIG. 9 is an elevation of the control wedges in engagement with the sliding guide for turning the program drum through two steps in the opposite direction.
Figure 10:
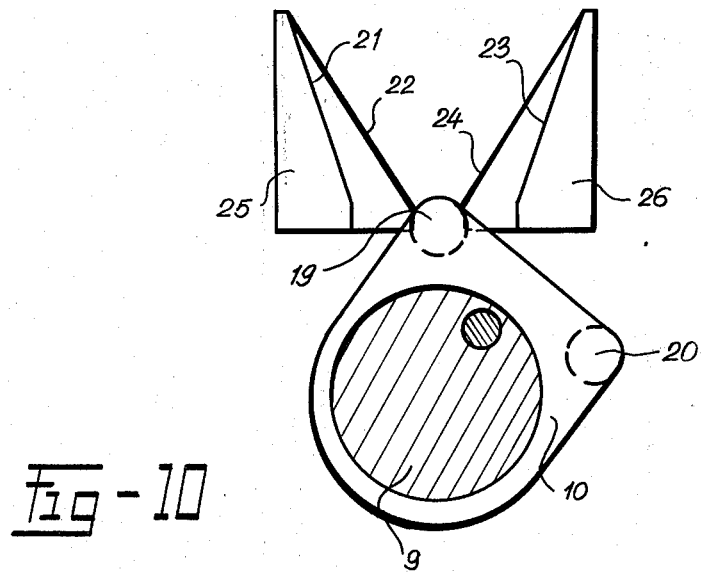
FIG. 10 is a schematic top view of the control wedges with the sliding guide turned through two steps in the opposite direction.

Immediately after the turning and locking of the program drum 6, the inclined surface 43 of the unlocking wedge 42 (FIG. 3) comes in engagement with the rod 15 which is slidingly arranged in the cylindrical body 9. The opposite end of the rod 15 turns the coupling pawl 13 around the pivot bolt 12, whereby one of its ends comes out of engagement with the slot 14 of the program drum 6. The cylindrical extensions 19 and 20 of the sliding guide 10 thereafter come into engagement with the lateral surfaces 40, 41 of the return wedges 38 and 39 (FIG. 4) which simultaneously return the sliding guide 10 and the coupling pawl 13 into the fundamental position. In the course of the following movement of the support 29, the rod 15 is disengaged from the unlocking wedge 42 and returns by the action of the spring 17 via the pressure bolt 16 and the coupling pawl 13 into its original position. The coupling pawl 13 thereby connects the cylindrical body 9 with the program drum 6, which is thus prepared for a further turning. It should be noted that the return wedges are as effective in moving the sliding guide which has been turned two steps back (FIG. 10) to the fundamental position as they are for a sliding guide which has been moved one step (FIG. 8).

The cylindrical extensions 19 and 20 of the sliding guide 10 thereafter come into engagement with the lateral surfaces 66 and 67 of the guiding ledges 64 and 65 by which they are guided until one revolution of the support 29 is finished, whereafter they again come in engagement with the control wedges 25 or 26. The guiding ledges 64 and 65 thus prevent a spontaneous turning of the sliding guide 10.

If the program drum 6 has to be turned for one step in a first direction, the control wedges 25 and 26 are displaced in their height so that one of the control wedges 25, 26 is moved for one step. A turning of the two-arm lever 31 around its pivot bolt 32 is thereby caused by the respective bolt 35, 36, the other arm of the two-arm lever 31 displacing, due to the action of the other bolt 35 or 36, the second control wedge 25 or 26 in the opposite direction i.e. into a position closer to the table equally for one step so that in the course of turning of the support 29 a respective one of the top most lateral surfaces 21, 23 of the control wedges 25, 26 comes into engagement with the respective one of cylindrical extensions 19, 20 of the sliding guide 10. Thus the sliding guide 10 and the program drum 6 are turned in said first direction for one step, i.e. through one stage of the pegs 47.

If the program drum 6 has to be turned for one step in the second, i.e. opposite direction, the second of the control wedges 25, 26, is displaced in its height, while the first of the control wedges 25, 26 is caused to change its position closer to the table 2, so that in the course of turning the support 29 the second of the topmost lateral surfaces 21, 23 of the control wedges 25, 26 comes into engagement with the second of the cylindrical extensions 19, 20 of the sliding guide 10. Thus the program drum 6 is turned in the second opposite direction through one stage of the pegs 47.

The turning of the program drum 6 through two or more steps is accomplished similarly with the only difference, that the control wedges 25 and 26 are adjusted in their axial position or height so that one of their further lateral surfaces 22, 24, the number of which corresponds to the number of turning steps of program drum 6 always comes into engagement with one or the other of cylindrical extensions 19 or 20 of the sliding guide 10. If both control wedges 25 and 26 are adjusted to the same height, all their lateral surfaces 21, 22, 23 and 24 are beyond engagement with one of the cylindrical extensions 19, 20 of the sliding guide 10 so that the program drum 6 remains at rest and the adjustment program is repeated. The control wedges 25 and 26 are locked in any adjusted position by a spring loaded locking bolt (not shown) which enters a respective recess 37.

Specifically, the wedge 25 is locked in its position by means of a ball 68 and a spring 69 and a recess 37 of the wedge 26 by means of a two-armed (first-class) lever 31. As the pin 35 of the wedge 25 and the pin 36 of the wedge 26 are in the double-sided recesses of the lever 31, an interlocking of only one of the two wedges 25 and 26 need be effected. In the structure shown herein, the wedge 26 has been chosen to be the one which is interlocked. The spring-loaded locking bolt is shown at 68 in FIG. 5A.

The two-armed lever 31 is used for adjustment of the wedges 25, 26. The mechanism controlling the lever 31 is not a part of the present invention. Similar mechanisms for this purpose are shown in U.S. Pats. Nos. 3,759,069, 3,748,871, and 3,783,640.

Figure 5:
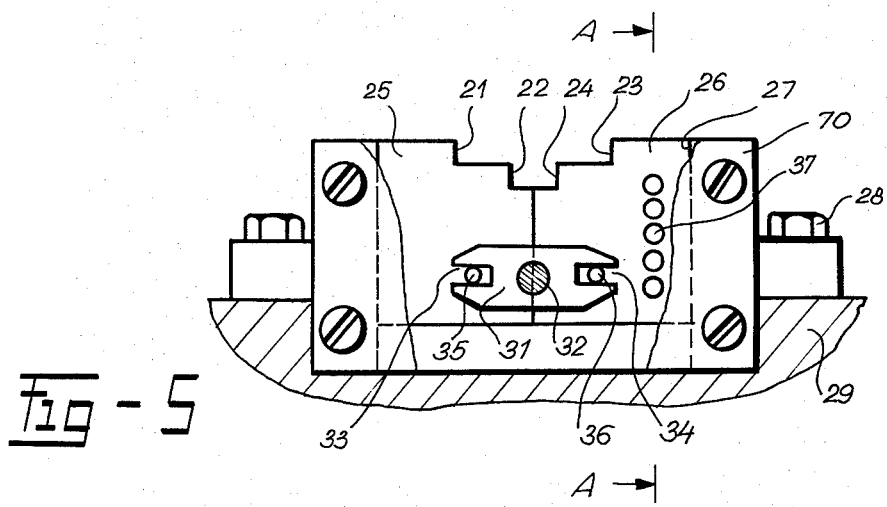
FIG. 5 is a view in elevation of the control wedges in a position beyond engagement with the sliding guide.
Figure 6:
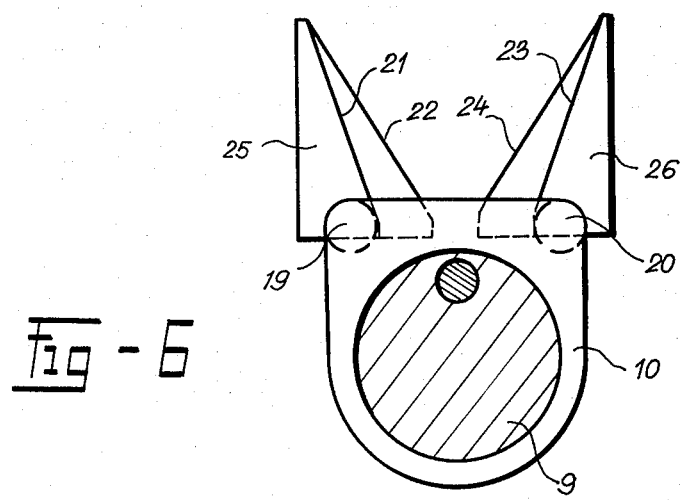
FIG. 6 is a schematic top view of the control wedges beyond engagement with the sliding guide.
Figure 7:
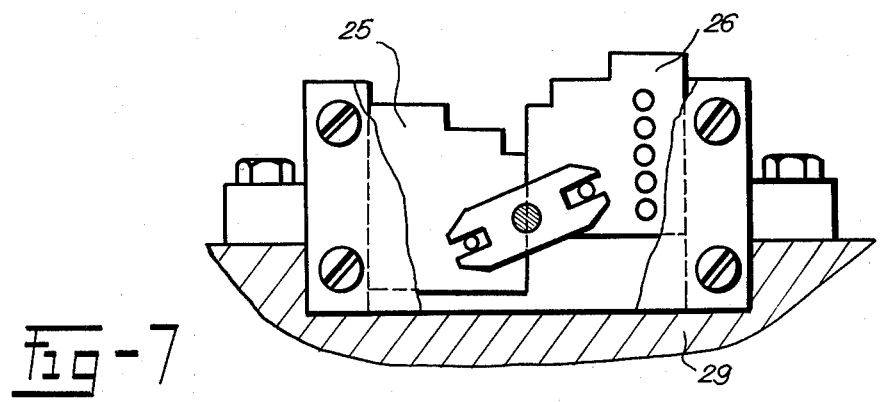
FIG. 7 is an elevation of the control wedges in engagement with the sliding guide for turning of the program drum through one step.

The section A—A shown in FIG. 5 passes through the place of the recess 37 on the control wedge 26. FIG. 5A illustrates the securing of the control wedge 26 by means of a ball 68, which is pressed into the conical shaped recess 37 due to the action of the spring 69. The ball 68 with the spring 69 slidably arranged in the recess 71 in the cover 70 of the guide 27.

The invention can be applied to circular knitting machines for pattern control in distributing and feeding devices with cylinder and dial cams and with further arrangement having rotatably supported program drums or other elements with similar functions.

Although the invention is illustrated and described with reference to a plurality of preferred embodiments thereof, it is to be expressly understood that it is in no way limited to the disclosure of such a plurality of embodiments but is capable of numerous modifications within the scope of the appended claims.

What is claimed is:

1. A program control device for a knitting machine having a frame, said control device comprising a program drum arranged rotatably on the frame of the machine, a cylindrical body supported coaxially on said program drum at one end thereof, the end of the cylindrical body confronting the program drum being provided with a transverse recess, a coupling pawl pivotally supported in said recess, a plurality of slots provided on the end face of the program drum which confronts the cylindrical body, the coupling pawl being adapted temporarily to connect the cylindrical body with the program drum by engagement of one end of the coupling pawl in one of said slots in the program drum, a sliding guide on the other end of the cylindrical body remote from the program drum, a plurality of extensions arranged on said sliding guide, a plurality of control wedges with lateral surfaces arranged on a machine part adjustably as to their axial height opposite to the sliding guide, a plurality of return wedges arranged on said machine part, the control wedges performing a relative movement with respect to the program drum for engagement with said extensions of the sliding guide, and means for controlling the position of the coupling pawl in said cylindrical body for selectively connecting the cylindrical body with the program drum and disconnecting it therefrom.

2. A control device as in claim 1, wherein the coupling pawl is in the form of a first-class lever having two arms, the control means for the control of the position of the coupling pawl is a rod slidably arranged in the cylindrical body, one end of the rod being adapted for engagement with a first arm of the coupling pawl, the other end of the rod being adapted for engagement with a pawl unlocking wedge, and yieldable means constantly urging the coupling pawl toward the position in which it couples the program drum to the cylindrical body.

3. A control device as in claim 2, wherein the yieldable means is a spring-loaded pressure bolt slidably arranged in the cylindrical body, the pressure bolt engaging the second arm of the coupling pawl and constantly urging it toward its locking position wherein it couples the program drum and the cylindrical body.

4. A control device as in claim 1, comprising means for preventing a free turning of the cylindrical body when the extensions of the sliding guide are out of engagement with both the control and the return wedges.

* * * * *